United States Patent Office 3,497,405
Patented Feb. 24, 1970

3,497,405
AMMONIUM NITRATE OF IMPROVED SENSITIVITY
John N. Maycock and Louis Witten, Baltimore, Md., assignors to Martin Marietta Corporation, New York, N.Y., a corporation of Maryland
No Drawing. Filed Apr. 17, 1968, Ser. No. 721,927
Int. Cl. C06b 1/04
U.S. Cl. 149—46                                8 Claims

ABSTRACT OF THE DISCLOSURE

A more sensitive ammonium nitrate explosive is provided by the method of dissolving ammonium nitrate in a solvent, along with a relatively small molar percent of a catalytic material, such as a chromate or dichromate salt, and then recovering crystals from the solution.

---

This invention relates to novel compositions of ammonium nitrate having more rapid rates of thermal decomposition, and to methods of preparing them.

Ammonium nitrate is a commonly used explosive. It is, however, extremely difficult to detonate, and when used as an explosive, a catalyst, or sensitizer, is usually added to facilitate detonation. It is the object of this invention to provide an ammonium nitrate based material with a combustion catalyst incorporated that is more efficient than such materials previously known to the art. It is a further object of this invention to provide a process for producing ammonium nitrate explosives having enhanced rates of thermal decomposition. The combustion catalyst incorporated in accordance with this invention may, of course, be in addition to other materials, such as hydrocarbons, cellulosic materials, and the like which are also often added to ammonium nitrate when preparing an explosive.

In a co-pending application by the same inventors, Ser. No. 589,185, filed Oct. 19, 1966, there is described a particular method for enhancing the rate of thermal decomposition of high energy materials. In accordance with that method, broadly and briefly, the enhancement is obtained by substituting for some of the anions in the host material anions having a greater valence. In accordance with the present invention, the thermal decomposition rate of ammonium nitrate is enhanced by incorporating into the crystalline lattice ions that satisfy the criteria as expressed above of our co-pending application, and which also satisfy another requirement as set forth below. The substituent ions should be such that the resulting doped material will have an absorption band on the long wavelength side of the absorption band in solution of the host material.

The inventive compositions of matter and processes for producing them are described in detail below.

In the examples given herein, the data describing the improvement effected by this invention is in terms of increased rate of thermal decomposition, and lowered temperature of thermal decomposition. Increases in these parameters indicate that the improved material also has a higher shock sensitivity, making it easier to detonate. This correlation is described in U.S. Patents Nos. 2,992,912 and 3,269,879.

Laboratory grade ammonium nitrate was dissolved in distilled water. A corresponding mole percentage of ammonium chromate was placed in the solution. The solution temperature was raised to 70° C., at which point all of the solids were dissolved. The solution was then permitted to cool to room temperature. The crystalline precipitate was then filtered off and dried for about 24 hours under a vacuum of about $10^{-4}$ mm. of mercury.

The dried crystals were then ground and passed through a 90–100 micron sieve. Samples of 5 mg. each of the resulting doped ammonium nitrates were thermally decomposed in an inert helium atmosphere in a Mettler Thermoanalyzer, which provides simultaneous thermogravimetric analysis (TGA) and differential thermal analysis (DTA) for each sample. For purposes of comparison, 5 mg. samples of the same grain size were prepared of laboratory grade ammonium nitrate mixed with ammonium chromate instead of being doped. The results of the thermal decomposition of these samples for various mole percentages of ammonium chromate are given below in Table I:

TABLE I

| Mole percent $CrO_4$ | Manner of incorporation | Main decomp. temp., °C. | Temp. for 50% decomp., °C. | Percent decomp. at 200° C. |
|---|---|---|---|---|
| 0 | | 280 | 262 | 0 |
| 0.1 | Mixed | 264 | 253 | 3 |
| 0.1 | Doped | 250 | 238 | 10 |
| 1.0 | Mixed | 224 | 218 | 10 |
| 1.0 | Doped | 216 | 208 | 30 |
| 2 | Mixed | 216 | 210 | 20 |
| 2 | Doped | 205 | 199 | 50 |
| 5 | Mixed | 204 | 198 | 63 |
| 5 | Doped | 196 | 191 | 100 |

The main decomposition temperature for which data is supplied in Table I represents the center temperature of the decomposition endotherm or exotherm; the other two headings are self-explanatory.

The catalyst lowers the temperature for various stages of decomposition, or, stated conversely, enhances the rate of thermal decomposition.

It will be seen from the results of Table I that as is already known the chromate ion is an effective catalyst for ammonium nitrate. It is also obvious, by comparing the figures for identical molar mixes and doped materials, that chromate ions incorporated into the ammonium nitrate host lattice are much more effective catalysts than a similar number of ions incorporated in a mix. For instance, the same main decomposition temperature (216° C.) obtained with only one mole percent of ammonium chromate dopant requires two mole percent of mixed ammonium chromate. Similarly, substantially the same main decomposition temperature as achieved with two mole percent dopant requires five mole percent of mixed catalyst. The temperatures for 50% decomposition are close for one mole percent doped and two mole percent mixed, and also for two mole percent doped and five mole percent mixed. In general then, the ammonium chromate dopant of this invention will be at least twice as effective a catalyst as the mechanically mixed ammonium chromate conventionally used. Since the price of ammonium chromate is approximately two and a half times that of equal weight of ammonium nitrate, the commercial advantage of this increased efficiency is apparent. Note that all of the decomposition temperatures as given in Table I are substantially above the 170° C. melting point of ammonium nitrate.

The term "catalyst" is used broadly herein to denote any material that promotes a reaction, and is not limited to reaction-promoting materials that are recoverable after the reaction has occurred.

Similar tests, using chromate ions as a catalyst, were run on larger samples as follows. Two 15 mg. samples of laboratory grade ammonium nitrate doped with one mole percent of ammonium chromate were prepared in a manner identical to the preparation of the 5 mg. samples described above. Also, one 15 mg. sample of laboratory grade ammonium nitrate with one mole percent of ammonium chromate thoroughly mixed in was prepared identically to the mixed 5 mg. samples described above. Each of these three samples was thermally decomposed in a Mettler Thermoanalyzer in an inert helium atmosphere with a temperature rise of 6° C. per minute. The data below in Table II shows the average residual weight of the two doped 15 mg. samples at each of several temperatures compared with the residual weight of the mixed 15 mg. sample at each of the same temperatures.

TABLE II

| Temp., ° C. | Weight in mg. | |
| --- | --- | --- |
| | Mixed | Average of two doped samples |
| 180 | 14.8 | 14.2 |
| 190 | 14.3 | 10.2 |
| 200 | 11.7 | 2.9 |
| 210 | 7.0 | 0.5 |

The data given above in Table II, when compared with the Table I data for the smaller 5 mg. samples, confirms the significant increase in the rate of thermal decomposition when ammonium nitrate is doped rather than mixed with a catalyst, and also indicates that for larger samples the effect is greatly enhanced. Table I indicates that for a 5 mg. sample doped at the one mole percent level, 30% of the sample would be decomposed at 200° C. For a 15 mg. sample doped at one mole percent, however, Table II shows that only 2.9 mg. of the original 15 mg. would remain at 200° C.

Next a 15 mg. sample of laboratory grade ammonium nitrate doped at the one mole percent level with potassium dichromate ($K_2Cr_2O_7$) was prepared in exactly the same manner as the examples described above. For comparison purposes a 15 mg. sample of laboratory grade ammonium nitrate mixed with one mole percent potassium dichlorate was prepared in a manner identical to that used in the preparation of the mixed samples described above.

Each of these samples was thermally decomposed in a Mettler Thermoanalyzer in an inert helium atmosphere with a temperature rise of 6° C. per minute. The sample with the mixed catalyst decomposed substantially completely at approximately 198° C., and the sample doped with potassium dichromate catalyst decomposed substantially completely at 196° C. Both decompositions proceeded more rapidly than did those for the 15 mg. samples mixed or doped with chromate for which the decomposition data is given in Table II. Both of these exothermic decompositions proceeded so rapidly that they were substantially detonations, hence it was impossible to compile a meaningful table of residual weight vs. temperature readings similar to that provided in Table II. This was illustrated also by the fact that the Mettler Thermoanalyzer was not able to maintain its programmed temperature regime. This has only been observed with this machine previously with military explosives, such as HMX, which gives some indication of the rapidity of decomposition.

While in the examples given water is used as the solvent because of its convenience, obviously the invention may be practiced with other suitable solvents. The only requirement of the solvent is that it leave intact the ionic structure of the solutes.

The parameters of the process as described above are illustrative rather than critical or limiting. As any suitable solvent may be used, so may any temperature regime that will suffice to dissolve the solutes in the solution without damaging their ionic structures. Crystals may be recovered from the solution not only by precipitation as in the examples, but by any other convenient method, such as by evaporation of the solvent.

The chromates and dichromates described above are merely exemplary of the compounds that may be used as catalytic dopants for ammonium nitrate in accordance with the principles of this invention. Other compounds that may be cocrystallized with ammonium nitrate in accordance with this invention are salts of the transitional elements having the possibility of multivalent states and possessing the requisite absorption characteristics with respect to the absorption band of ammonium nitrate. The cyclopentadiene complexes, or metallocenes, in which the metal can be copper (II), niobium (II, III), cobalt (II, III), rhodium (III), iridium (III), ruthenium (III), manganese (II), chromium (II), vanadium (III, IV) or titanium (III, IV) will also be effective as catalytic dopants when cocrystallized with ammonium nitrate from a melt.

What is claimed is:
1. A new composition of matter comprising an ammonium nitrate lattice with chromate or dichromate anions substituted for a portion of the nitrate anions in the lattice structure.
2. The composition of matter of claim 1 in which said anions are chromates.
3. The composition of matter of claim 1 in which said anions are dichromates.
4. A method for producing ammonium nitrate having an enhanced rate of thermal decomposition comprising the steps of:
   (a) dissolving in a solvent ammonium nitrate and a salt containing an ion selected from the group consisting of chromates and dichromates; and
   (b) recovering crystals from the solution.
5. A method for producing ammonium nitrate having an enhanced rate of thermal decomposition comprising the steps of:
   (a) dissolving in a solvent ammonium nitrate and a chromate salt; and
   (b) recovering crystals from the solution.
6. A method for producing ammonium nitrate having an enhanced rate of thermal decomposition comprising the steps of:
   (a) dissolving in a solvent ammonium nitrate and a dichromate salt; and
   (b) recovering crystals from the solution.
7. A method for producing ammonium nitrate having an enhanced rate of thermal decomposition comprising the steps of:
   (a) dissolving in water ammonium nitrate and ammonium chromate; and
   (b) recovering crystals from the solution.
8. A method for producing ammonium nitrate having an enhanced rate of thermal decomposition comprising the steps of:
   (a) dissolving in water ammonium nitrate and potassium dichromate; and
   (b) recovering crystals from the solution.

References Cited

UNITED STATES PATENTS

| 3,039,903 | 6/1962 | Enoksson | 149—46 X |
| 3,148,946 | 9/1964 | Griffith | 149—46 X |
| 3,166,450 | 1/1965 | Kaufman | 149—46 |
| 3,269,879 | 8/1966 | Stammler et al. | 149—46 |

CARL D. QUARFORTH, Primary Examiner

STEPHEN J. LECHERT, Jr., Assistant Examiner